455-611 AU 233 EX
FIP3106 XR 3,539,245

United States Patent

[11] 3,539,245

[72] Inventor Michael J. Brienza
Vernon, Connecticut
[21] Appl. No. 672,924
[22] Filed Oct. 4, 1967
[45] Patented Nov. 10, 1970
[73] Assignee United Aircraft Corporation
East Hartford, Connecticut
a corporation of Delaware

[54] LASER-ACOUSTIC SIGNAL PROCESSOR

3 Claims, 3 Drawing Figs.

[52] U.S. Cl. 350/161, 307/88.3; 250/191
[51] Int. Cl. G02f 1/00
[50] Field of Search 307/88.3; 350/161; 250/199

[56] References Cited
UNITED STATES PATENTS
3,462,603 8/1969 Gordon 307/88.3
OTHER REFERENCES
Brienza, "Applied Physics Letters," Mar. 1, 1968, pp. 181–184, 307/88.3

*Primary Examiner*—Roy Lake
*Assistant Examiner*—Darwin R. Hostetter
*Attorney*—Donald F. Bradley

ABSTRACT: An acoustic signal is generated in an acoustic cell such as a quartz bar, and a laser beam is scanned through the cell intersecting the acoustic signal. An undiffracted beam and a frequency shifted beam are produced, and both beams are optically heterodyned at a photodetector to reproduce the acoustic signal. Depending on the rate and direction of laser beam scanning, a time compressed, time expanded or time inverted output signal may be produced. The laser beam may also be intensity modulated to further vary the output signal.

Patented Nov. 10, 1970 3,539,245

INVENTOR
MICHAEL J. BRIENZA
BY Donald J. Bradley
ATTORNEY

LASER-ACOUSTIC SIGNAL PROCESSOR

BACKGROUND OF THE INVENTION

1. Field of Invention

This invention relates to signal processing, and in particular to laser-acoustic interaction to produce an output signal which is a time and frequency related function of an input signal.

More particularly, this invention relates to the scanning by a laser beam of an acoustic cell in which an input signal has been stored in order to produce an output signal which is a compressed, expanded or inverted version of the stored input signal, or some variation thereof. Additional modifications may be produced by intensity modulation of the laser beam.

2. Description of the Prior Art

Many techniques are known in the electronic arts for signal processing, including pulse envelope compression and pulse expansion. Most of the electronic techniques merely time compress the pulse envelope with the energy content of the output being identical to that of the input. The invention disclosed herein is distinguished by the fact that it processes time and conserves the information conveyed. When time inversion is referred to herein, a time reversal, or back-to-front inversion is implied, not merely a 180° phase shift of the signal.

Laser-acoustic techniques are also known in the art in the form of beam scanning, modulation and pulse shaping devices and delay lines. The intersection of a stationary laser beam with a traveling or standing acoustic wave will, depending on the frequency of the acoustic wave and the width of the laser beam, produce either refraction or diffraction of the laser beam. Examples of laser-acoustic systems may be found in copending application Ser. No. 552,315 filed May 23, 1966 now abandoned by Anthony J. DeMaria entitled "Laser Pulse Shaping Using Acoustic Waves". A delay line using laser-acoustic techniques is described and claimed in copending application Ser. No. 642,829 filed June 1, 1967, now U.S. Pat. No. 3,463,573 by Michael J. Brienza entitled Continuously Variable Laser Acoustic Delay Line ".

The configuration of this invention is basically similar to laser-acoustic delay lines. In both systems an acoustic wave in the megacycle frequency range is generated in an acoustic cell, and a laser beam is propagated through the cell to intersect the acoustic wave. Since the acoustic wave is moving, the apparatus is like a moving diffraction grating, and two output beams are produced, an undiffracted beam and at least one frequency shifted beam. The two beams are optically heterodyned to produce a signal which is a reproduction of the original acoustic wave.

In the delay line configuration, the laser beam is stationary and the heterodyned output signal is a duplicate of the acoustic wave, but delayed in time.

SUMMARY OF THE INVENTION

The present invention differs from the laser-acoustic delay lines in that the laser beam is scanned through the acoustic wave at a rate and in a direction which will cause the heterodyned output signal to be a compressed, expanded or time inverted replica of the acoustic wave, or some combination thereof. A frequency shift of the output signal relative to the input acoustic wave is inherent in the time shift.

In accordance with another aspect of the invention, the laser beam may be intensity modulated to further vary the output signal.

Thus, by practicing this invention, one can controllably process a microwave signal to be significantly different than the input signal by programming the intensity and direction of a laser beam in a configuration similar to an optically scanned laser acoustic delay line.

One particularly important aspect of this invention is the ability to compress, invert or code a signal. None of the prior art teaches variable microwave pulse compression techniques as disclosed and claimed herein.

It is therefore an object of this invention to provide a novel, laser acoustic signal processor.

Another object of this invention is apparatus to produce continuously variable time compression, expansion and inversion of an input signal.

A further object of this invention is a novel laser acoustic system in which a laser beam is scanned through an acoustic cell containing a stored signal to provide signal processing.

A still further object of this invention is a laser acoustic signal processor in which further variations in the output signal may be produced by intensity modulating the input signal.

DESCRIPTION OF THE PREFERRED EMBODIMENT

Figure 1:
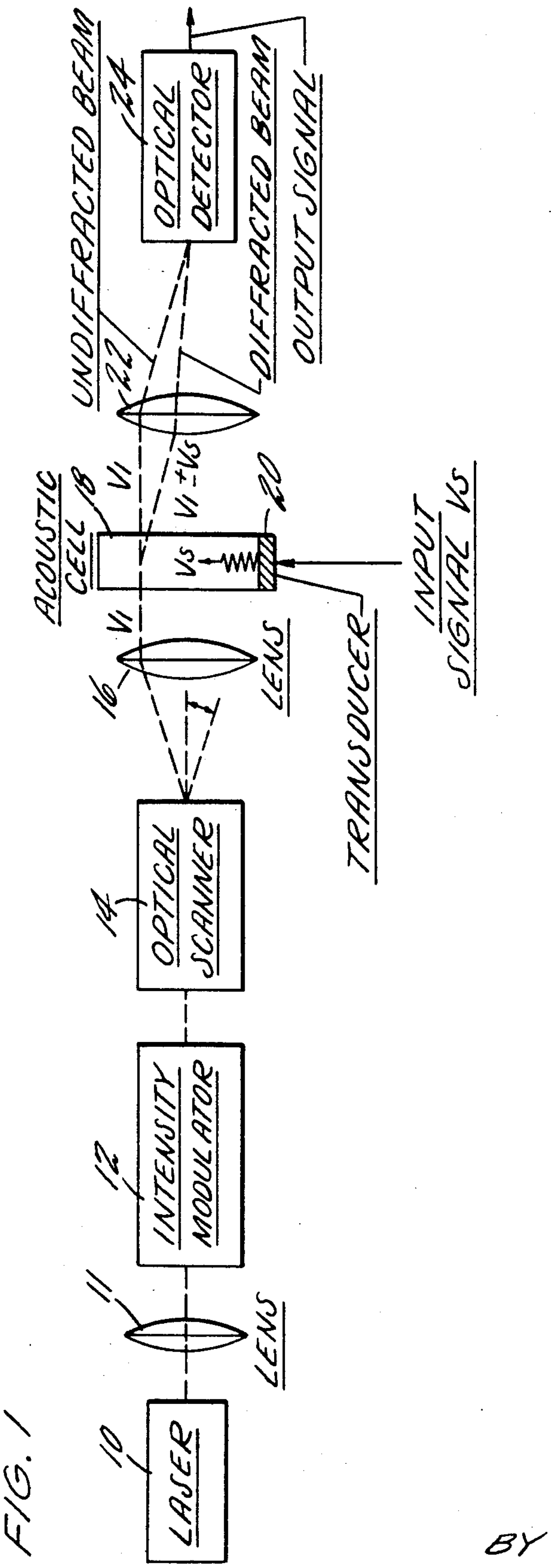
FIG. 1 shows schematically a preferred embodiment of the continuously variable laser acoustic time compression, expansion, reversal and delay device.

Referring to FIG. 1, any known type of laser apparatus 10 is optically pumped to produce a laser beam. The laser beam is then fed through an intensity modulator 12 and an optical scanner 14, the optical scanner producing an up and down scanning motion of the laser beam.

Intensity modulator 12 may consist of a Kerr cell or Pockel cell positioned between cross polarizers, or may simply be a rotating disc in which there are a single one or a number of holes through which the laser beam may propagate.

Optical scanner 14 may consist of an acoustic cell in which an acoustic wave produces a refractive index change which causes refraction and therefore scanning of the laser beam. Other optical scanning devices are known such as prisms and rotating mirrors.

The optical scanner 14 is placed preferably at the focal point of a lens 16 so that any laser ray in the field of the lens 16 will emerge paraxially, effectively transforming the angular displacement of the laser beam from the optical scanner 14 to a lateral displacement.

The laser beam, of a frequency $V_1$, is then propagated through an acoustic cell 18 which may be merely a quartz delay bar or a liquid filled cell. Attached to the acoustic cell 18 is an acoustic transducer 20 which is actuated by an input signal of frequency $V_s$ to generate within the acoustic cell an ultrasonic acoustic wave of, for example, 100 megacycles.

As the acoustic wave propagates through cell 18, it intersects the scanned laser beam and the laser beam is diffracted. The acoustic wave acts like a moving diffraction grating. Because of the diffraction effect, an undiffracted beam is produced and a number of diffracted orders.

The undiffracted beam and one of the diffracted order beams impinge on a lens 22, the lens being focused on an optical detector 24 such as a photodiode. By means well known in the art, the two beams heterodyne at the optical detector and reproduce any Doppler frequency shift on the diffracted light due to the moving acoustic wave. Thus the output signal from the optical detector will be an expanded, compressed or time inverted and correspondingly frequency shifted version of the acoustic wave, and may be amplitude modulated in addition by intensity modulation of the laser beam.

If the laser beam were stationary, the output signal produced by photodetector 24 would duplicate the original acoustic wave in frequency and time duration when the acoustic wave traverses the laser beam. However, since in this case the laser beam is scanned, the output signal will be somewhat altered relative to the input acoustic wave signal.

It is convenient to think of the propagated acoustic wave as being stored in the acoustic cell 18 where it can be read out in any desired fashion by appropriate laser beam manipulation. The system is analogous to a tape recorder. The propagating acoustic wave is similar to a recorded signal on a moving tape. If the tape is allowed to pass over the readout head at the same speed and direction as when it was recorded, the output signal will duplicate the original signal. If, however, the tape is speeded up, slowed down or even cut up and pasted together in a different order, the output is considerably altered. Randomly or continuously moving the volume control upon playback will further alter the output signal. Thus the scanning and intensity modulated laser beam can process the signal in much the same way as altering the speed, direction or volume of a tape recorder.

If the laser beam is moving with a constant velocity, $V_1$ along the acoustic cell while the acoustic wave is interacting with it, the output signal will be altered in frequency and time by the following relations:

$$f_o=f_i(1-v_1/v_s), \quad \text{Eq. 1}$$

$$t_o=t_i/(1-v_1/v_s), \quad \text{Eq. 2}$$

where $f_i$, $t_i$ and $f_o$, $t_o$ are the frequency and time duration of the input and output signals respectively; and $v_s$ is the acoustic velocity in the acoustic cell. The scan velocity, $v_1$ is defined positive in the direction of $v_s$.

Thus, if $v_1$ is less than 0, the output signal will be compressed in time and upshifted in frequency.

If $v_s$ is greater than $v_1$ which is greater than 0, the signal will be expanded and downshifted in frequency.

If $v_1$ equals $v_s$, the acoustic diffraction grating appears stationary and yields no Doppler shifted light.

For $v_1$ greater than $v_s$, the output signal will be reversed in time. Where 2 $v_s$ is greater than $v_1$ which is greater than $v_s$, the output signal will be reversed in time, expanded and downshifted. Where $v_1$ is greater than 2 $v_s$, the output signal will be reversed in time, compressed and up shifted. Where $v_1$ equals 2 $v_s$, the output signal will be the identical pulse except reversed in time.

A further important aspect of this invention is that the diffraction angle between the undiffracted beam and one of the diffracted orders as a result of the optical acoustical interaction will not change significantly even when the frequency of the Doppler shifted diffracted order beam is increased substantially and the beat frequency between the diffracted order and the undiffracted beam changes. For most practical applications, the fractional change in frequency of the diffracted light is on the order $10^{-7}$ to $10^{-4}$, thereby yielding a similar fractional change in the optical wavelength and thus the diffraction angle. This means that a high frequency output signal may be obtained without using Bragg angle diffraction techniques, and the input signal $v_s$ need not be in the high megacycle range to produce a high frequency output signal.

A figure of merit often applied to pulse envelope compression is the time-bandwidth product. In the present case, the bandwidth is essentially the inverse of the acoustic transit time across the width of the laser beam and the maximum input pulse length is the usable length of the acoustic cell divided by the acoustic transit time. Therefore the time-band width product is merely the length of the cell divided by the laser beam width. The fractional bandwidth of the output signal for this invention is a constant.

Experimental results are given for this invention in FIG. 2. For the experiment, a rotating mirror optical scanner was used driven by a hysteresis motor. The focal length for lens 16 was 104 cm., and a scan velocity $v_1$ at the acoustic cell of $6.6 \times 10^5$ cm. per second was produced. The acoustic cell 18 was fused silica with a quartz transducer 20.

Figure 2A:
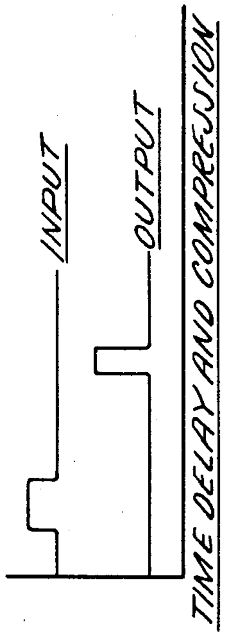
FIG. 2 shows typical experimental curves of time delay, compression, reversal and expansion of an input signal.

The results of a time compression of a 21 megacycle pulse are shown in FIG. 2A. In this case, $V_s$ was $3.82 \times 10^5$ cm. per second, while $v_1$ was $-6.6 \times 10^5$ cm. per second. As predicted by the equations, the output signal appeared at 58 megacycles with a time compression of 2.7:1.

Figure 2B:
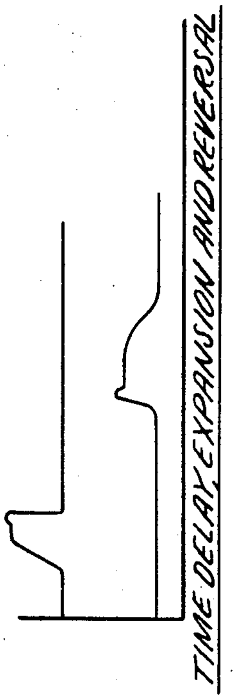

FIG. 2B shows a time reversed expanded experiment. For this case, $v_1 = +1.7\ v_s$, *i.e.*, once the pulse was launched in the acoustic cell, the laser beam swept across it from back to front causing the output signal to be reversed in time and downshifted by 0.7 of its input frequency. It was also stretched in time accordingly.

Amplitude modulation of the output signal can be achieved by intensity modulation. For example, turning the intensity modulator off for an instant inserts a notch in the output pulse. Masking may also be used for intensity modulation.

A number of varieties of time processing can be achieved by simultaneously control of the intensity and scan speed of the laser beam. As an example, an accelerated scan can either chirp or dechirp an input signal, such signals being extremely useful in radar and code type systems.

It should be noted that lenses 16 and 22 may not always be required if the scanning angle of the laser beam is very small. The purpose of the lenses is to focus beams of various angles of incidence on the acoustic cell, and focus angularly spread output beams on the optical detector 24. Mirrors may be used in place of or in addition to a lens.

In some applications, a telescope or lens 11 may be placed on the laser itself to apply a small convergence angle on the laser beam to thereby focus the light beam on the acoustic cell 18. If the convergence angle is made slightly larger than the diffraction angles, the diverging diffracted and undiffracted beams emerging from the acoustic cell will then substantially overlap and heterodyne to reproduce the Doppler frequency shift. This novel heterodyning technique is most useful for low frequencies where the diffraction angle is small. At acoustic frequencies above about 150 megacycles, Bragg angle diffraction will take place as opposed to normal diffraction. In this type of diffraction only one diffracted order is produced, and the diffraction angle is larger than for lower frequencies. Focusing on the optical detector and heterodyning as a result of the overlap of the zero order and first order beams described above is not convenient in this mode of operation, and other types of heterodyning may be required. For limited frequency ranges, mirrors may be used to focus the beams on the detector. Many similar heterodyning schemes are known, and those skilled in the art will easily be able to adapt known methods to the particular embodiment.

It is apparent that alternative configurations can include the use of more than one laser beam and more than one input and output channel.

It is to be understood that the invention disclosed herein is not limited to the specific embodiment illustrated and described, but numerous modifications may be made without departing from its scope as defined by the following claims.

I claim:

1. Apparatus for time compressing an input signal comprising:
   - a medium in which an acoustic wave can be propagated;
   - means for generating a traveling acoustic wave in said medium;
   - means for generating a single coherent light beam;
   - scanning means for causing said single light beam to traverse said cell in a direction opposite the direction of propagation of said acoustic wave, said light beam intersecting said acoustic wave at an angle other than the Bragg angle whereby an undiffracted zero order signal and at least one frequency shifted diffracted order signal are produced; and
   - means for heterodyning said signals to produce an output which is upshifted in frequency relative to said acoustic wave.

2. Apparatus as in claim 1 and including means for intensity modulating said light beam.

3. Apparatus as in claim 1 in which said heterodyning means is an optical detector, and means including a lens positioned in the path of said zero order and diffracted order signals for focusing said signals on said detector.